Oct. 12, 1965

J. M. ANDRES 3,211,055

RESONANCE ABSORPTION FILTERING SYSTEM
FOR AN OPTICALLY PUMPED GAS CELL
Filed Nov. 22, 1960

JOHN MILTON ANDRES
INVENTOR.

BY *Albert Rosen*

ATTORNEY 3,211,055
RESONANCE ABSORPTION FILTERING SYSTEM
FOR AN OPTICALLY PUMPED GAS CELL
John Milton Andres, Rolling Hills Estates, Calif., assignor, by mesne assignments, to TRW Inc., a corporation of Ohio
Filed Nov. 22, 1960, Ser. No. 70,973
2 Claims. (Cl. 88—61)

This invention relates to the optical pumping art and, more particularly, to new and improved methods of and apparatus for providing a highly monochromatic optical pumping light beam.

Many devices, such as masers, gas cell frequency standards, atomic clocks and the like utilize the absorption, transmission, and emission characteristics of a resonant medium as a basis for establishing a control signal. In such applications, it is often necessary to induce the particles comprising a resonant medium to occupy preselected quantum energy levels resulting in an overpopulation of a first preselected quantum energy level as compared with a second preselected quantum energy level. The energy separation between these two quantum energy levels is accurately known and transitions from the overpopulated level to the other level provide a resonance condition for deriving the control signal.

One method of achieving this overpopulation condition is by a process termed optical pumping. In this process, an optical pumping light beam containing electromagnetic radiation having energy in a preselected wavelength traverses the resonant medium and the value of the preselected wavelength corresponds to a particular quantum energy transition of the resonant medium. The resonant medium absorbs energy from the optical pumping light beam and thereby the particles comprising the resonant medium are induced to occupy preselected quantum energy levels in which there is a greater population of particles in one of the two preselected quantum energy levels than the other. Therefore, as the population difference is increased, the control signal definition is enhanced.

It has been found that the more monochromatic the optical pumping light beam is in the preselected wavelength, the more efficient is the optical pumping process in inducing the overpopulation described above. However, for many resonant media there are also "de-pumping" wavelengths very close to the pumping wavelength which tend to reduce this pumping effect. It is desirable that the optical pumping light beam be highly monochromatic in the pumping wavelength as compared with the de-pumping wavelengths.

Prior optical pumping arrangements have not proven completely satisfactory in providing such a highly monochromatic optical pumping light beam. Filtering methods that have been utilized to eliminate undesired de-pumping wavelengths from the optical pumping light beam have often incorporated, for example, isotopes of the resonant medium. For many resonant media there may not be an isotope that effectively filters or, if one does exist, it may be costly, in very short supply, or be radioactive with a comparatively short half life.

This invention overcomes these filtering difficulties by providing an optical pumping arrangement that utilizes the resonant medium material itself as a filter to provide a highly monochromatic optical pumping light beam.

Accordingly, it is one of the more important objects of this invention to porvide an improved arrangement for generating an optical pumping light beam.

It is another object of this invention to provide a more highly monochromatic optical pumping light beam.

It is a further object of this invention to provide an arrangement in which particles of the same material comprising the resonant medium are utilized to filter the optical pumping light beam.

The foregoing and related objects are achieved in accordance with this invention by providing a filter gas cell containing a resonant medium intermediate an optical pumping lamp and the resonant medium of the main gas cell that is to be optically pumped. Electromagnetic radiation emitted from a filter lamp means induces the particles comprising the resonant medium in the filter gas cell to occupy a predetermined quantum energy level. This orientation of the particles in the filter gas cell is such that it effectively filters an optical pumping light beam by selectively absorbing the de-pumping wavelengths from the optical pumping light beam but permitting the pumping wavelengths to pass through. Therefore, when the filtered optical pumping light beam traverses the resonant medium of the main gas cell that is to be optically pumped, it is highly monochromatic in the pumping wavelengths as compared with the de-pumping wavelengths. While many other wavelengths than the pumping and de-pumping wavelengths may be present in the optical pumping light beam, it will be considered monochromatic when the ratio of energy in the pumping wavelengths to energy in the de-pumping wavelengths is very high.

This invention is explained in greater detail in the following description and with reference to the accompanying drawing, wherein similar reference characters indicate similar elements and in which.

The arrangements of this invention are predicated on certain quantum energy characteristics associated with the fine and hyperfine atomic structure of resonant media. Therefore, a brief discussion of these characteristics is presented prior to a detailed description of the embodiments of this invention.

Figure 1:
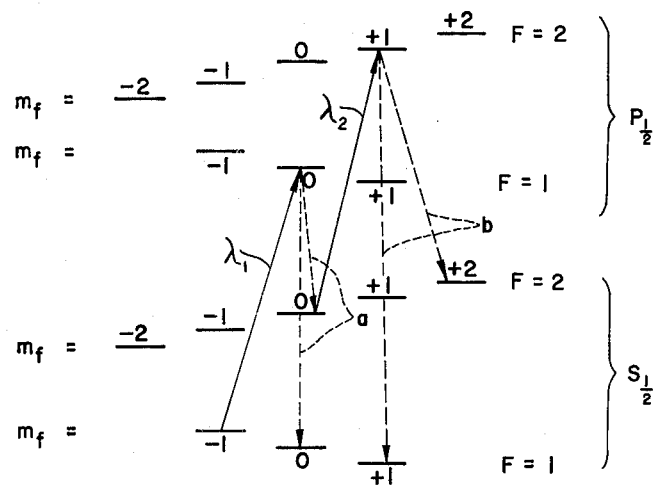
FIGURE 1 is a diagrammatic representation of the energy levels of a rubidium 87 atom.

The energy levels of interest in practicing this invention are illustrated on FIGURE 1 for rubidium 87, which may be considered a typical resonant medium. These levels are presented as they exist in the presence of an applied weak unidirectional magnetic field that induces the Zeeman splitting effect into the plurality of magnetic substates $(m_f)$ shown. (The rubidium 87 quantum structure, as shown in FIGURE 1, is utilized for illustrative purposes herein and it will be appreciated that similar diagrams may be constructed for other resonant media.) When Zeeman splitting occurs, the $S_{1/2}$ ground quantum energy state includes the two quantum levels, $F=1$ and $F=2$ and a total of eight separate magnetic substates: five in the $F=2$ level and three in the $F=1$ level.

The $P_{1/2}$ first optically excited state also has a corresponding number of F levels and $m_f$ magnetic substates, as the $S_{1/2}$ ground state, but the energy separations between the magnetic substates of the $F=2$ and the $F=1$ levels of the $P_{1/2}$ state are optically unresolvable while the energy separations between the magnetic substates of the $F=2$ level and $F=1$ level of the $S_{1/2}$ state are readily resolvable by optical means and are of accurately known frequencies. The transitions between the magnetic substates of the $F=2$ level and the $F=1$ level in the $S_{1/2}$ ground state provide the resonance condition for the rubidium 87 and are the basis for establishing a control signal when utilized in a gas cell frequency standard system, atomic clock, or the like. Thus, for rubidium 87, these two levels of the $S_{1/2}$ ground state are the preselected quantum energy levels of interest in practicing this invention to provide an improved optical pumping light beam.

When electromagnetic radiation in the form of an optical pumping light beam, which contains photons having energy in a wavelength equivalent to $\lambda_1$, as shown in FIGURE 1, impinges on a collection of rubidium 87 atoms in the $S_{1/2}$ ground energy state, those atoms in the magnetic substates of the $F=1$ level of the $S_{1/2}$ ground state are temporarily raised to the $P_{1/2}$ first optically excited state. Upon a drop down transition to the $S_{1/2}$ state, indicated in FIGURE 1 by the dotted lines $a$, the atoms may occupy positions in the magnetic substates of either the $F=2$ or $F=1$ levels of the $S_{1/2}$ state. Electromagnetic radiation having a wavelength equal to $\lambda_1$ and $\lambda_2$ is emitted from the rubidium 87 during these drop down transitions.

It will be appreciated, then, that as this optical pumping process continues, there is a depletion of the number of atoms in the $F=1$ level of the $S_{1/2}$ state and an increase in the number of atoms in the $F=2$ level of the $S_{1/2}$ state which tends to provide the desired overpopulation condition. If, at the same time, the optical pumping light beam contained photons having energy in a wavelength equivalent to $\lambda_2$, there would be a simultaneous depumping, illustrated on FIGURE 1 by dotted lines $b$, from the magnetic substates of the $F=2$ level to the magnetic substates of the $F=1$ level.

Therefore, to achieve a population difference, for example, by having more atoms in the $F=2$ level than in the $F=1$ level, it is necessary that the optical pumping light beam be highly monochromatic by having a greater concentration of photons in the wavelength $\lambda_1$ of FIGURE 1 than in the wavelength $\lambda_2$. The degree of population difference that can be achieved is thus a net effect and the more monochromatic the optical pumping light beam is in wavelength $\lambda_1$ compared with wavelength $\lambda_2$, the greater will be the net pumping effect to provide the population difference and the greater the population difference, the stronger is the resonance signal associated with the transitions between these two energy levels. In an analogous manner, the population of atoms comprising the resonant medium may be very much greater in the $F=1$ level than the $F=2$ level by providing an optical pumping light beam highly monochromatic in wavelength $\lambda_2$ as compared with wavelength $\lambda_1$.

It has been found that if an optical pumping light beam consists of photons having energy in both wavelengths $\lambda_1$ and $\lambda_2$ and is also circularly polarized, a different effect may be achieved than that described above. For this condition, the atoms comprising the resonant medium may be induced to occupy a particular preselected magnetic substate within the $F=2$ quantum energy level of the $S_{1/2}$ ground state. Thus, if the optical pumping light beam were right-hand circularly polarized, the angular momentum characteristics of the photons associated with the wavelengths $\lambda_1$ and $\lambda_2$ are such that on collision with the atoms, the atoms can only gain one $m_f$ magnetic substate number in being excited to the $P_{1/2}$ first optically excited state. On subsequent collapse of the atoms to the $S_{1/2}$ ground state (during which radiation is emitted from the atoms at approximately wavelengths $\lambda_1$ and $\lambda_2$), they can return to either the $F=1$ or $F=2$ level of the $S_{1/2}$ ground state at an $m_f$ magnetic substate either one greater, one less, or the same as it occupied at the $P_{1/2}$ first optically excited state. Statistically, there is equal probability of an atom returning to any one of these three magnetic substates. (Since atoms already in the $m_f=+2$ magnetic substate of the $F=2$ level of the $S_{1/2}$ ground state cannot gain one $m_f$ magnetic substate number, they are not raised to the $P_{1/2}$ first optically excited level and tend to remain at this magnetic substate.) It may be seen, then, that as this pumping action continues, virtually all atoms originally in the $F=1$ and $F=2$ levels will tend to populate the $m_f=+2$ magnetic substate of the $F=2$ level of the $S_{1/2}$ ground state.

Similarly, if such an optical pumping light beam containing energy in wavelengths $\lambda_1$ and $\lambda_2$ were left-hand circularly polarized, virtually all the atoms from both the $F=1$ and $F=2$ levels would be induced to occupy positions in the $m_f=-2$ magnetic substate at the $F=2$ level.

When the rubidium 87 atoms are in either the $m_f=+2$ or $m_f=-2$ magnetic substate of the $F=2$ level, the magnetic moment associated with each atom tends to be aligned in a direction parallel to the direction of the unidirectional magnetic field that induces the Zeeman splitting. When the magnetic moments of the atoms are aligned in the $m_f=+2$ magnetic substate, their polarity, with respect to the unidirectional magnetic field, is opposite to that when they are aligned in the $m_f=-2$ magnetic substate. Further, since virtually all the atoms are so aligned, the pumped rubidium 87 may be considered as exhibiting a net magnetic moment comprised of the sum of the individual magnetic moments associated with each atom. The net magnetic moment may then be considered as aligned parallel to the weak unidirectional magnetic field.

While this description of the physical principles involved in the practice of this invention has utilized atoms of rubidium 87 to illustrate the concepts, equivalent analogues may be drawn for other resonant media. Thus, this invention is not limited in its application to rubidium 87 in a gaseous state or atoms but may equally well be applied to all resonant media, including solid and liquid state, such as atoms of different elements and their isotopes, molecules, electrons, or collections of other elementary particles. In addition, this invention may also be utilized where the energy separation between two preselected magnetic substates is utilized as the resonant condition establishing a control signal. A further description of the optical pumping phenomena may be found in an article entitled "Optical Pumping," by Arnold L. Bloom in Scientific American, October 1960.

Figure 2:
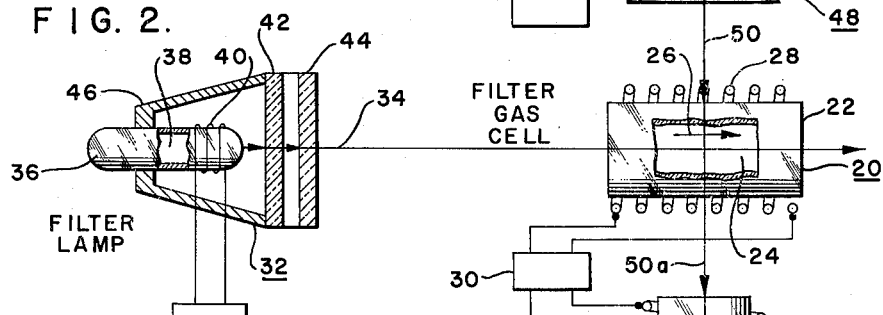
FIGURE 2 illustrates the structure associated with one embodiment of this invention.

The foregoing physical principles are utilized in this invention to provide an improved optical pumping light beam generation arrangement. FIGURE 2 illustrates the structure associated with one embodiment of this invention. In this embodiment there is a filter gas cell 20 having walls 22 that are transparent to preselected wavelengths of electromagnetic radiation. The filter gas cell 20 may be made of glass, quartz, or other media transparent to the wavelengths required for optical pumping. A resonant medium 24 is contained within the filter gas cell 20 and may be, for example, atoms of rubidium 87 in the gaseous state at a pressure of approximately $10^{-6}$ millimeters Hg absolute. Other gases, (not shown) such as hydrogen or helium, may also be included in the filter gas cell 20 and intermixed with the resonant medium 24 to act as buffer gases. A weak unidirectional magnetic field 26 is generated in regions containing the filter gas cell 20 by a magnetic field generator, illustrated by first coil means 28, which is energized by power supply 30. This weak unidirectional magnetic field 26 induces Zeeman splitting of the particles comprising the resonant medium 24 into its various magnetic substates.

A filter lamp means 32 is provided to generate a beam of electromagnetic radiation 34 that is utilized to pump the resonant medium 24 in the filter gas cell 20. The filter lamp means 32 comprises a tube means 36 containing a resonant medium 38. In the preferred embodiment of this invention, the resonant medium 38 is the same resonant medium that is contained in the filter gas cell means 20. Thus, for example, if the filter gas cell means 20 contains, as a resonant medium, atoms of rubidium 87 in a gaseous state, then the resonant medium 38 in the filter lamp means 32 is also atoms of rubidium 87 in a gaseous state.

An energizing coil 40, powered by supply 41, is provided on the filter lamp 32 to energize the resonant medium 38 and thereby induce an emission of electromagnetic radiation from the resonant medium 38. The filter lamp may be a vapor discharge lamp and may take the form of that disclosed in the copending application of Warren A. Marrison, Serial Number 852,266 filed on November 12, 1959, now U.S. Patent No. 2,974,243, entitled "Light Source."

The beam of electromagnetic radiation 34 that is emitted from the filter lamp 32 contains energy in wavelengths corresponding to the emission spectra of the resonant medium 38. The beam of electromagnetic radiation 34 is circularly polarized by a circular polarizer means 42 and then filtered by a filter means 44 which substantially transmits only preselected wavelengths contained in the beam of electromagnetic radiation 34. The wavelengths that this filter means 44 transmits are those wavelengths necessary to align the magnetic moments of the particles comprising the resonant medium 24 into a preferred quantum energy condition. If the resonant medium 24 and the resonant medium 38 are rubidium 87, the filter means 44 may take the form of what is termed a "$D_1$" filter and thereby pass only wavelengths $\lambda_1$ and $\lambda_2$, as illustrated on FIGURE 1.

After leaving the filter means 44, the beam of electromagnetic radiation 34 only contains substantially the wavelengths necessary to align the magnetic moments of the resonant medium 24. While theoretically, for the rubidium 87 spectra as stated above, these are the two discrete wavelengths $\lambda_1$ and $\lambda_2$, it has been found that due to Doppler broadening and the like, each wavelength extends over a small but discrete band of wavelengths centered about the theoretically true wavelengths.

A first reflector means 46 is included with the filter lamp means 32 and directs the beam of electromagnetic radiation 34 generated by the filter lamp towards the resonant medium 24 in filter gas cell 20. Due to the circular polarization of the beam of electromagnetic radiation 34 containing the wavelengths necessary to align the magnetic moments of the resonant medium 24, substantially all particles comprising the resonant medium 24 in the filter gas cell 20 are induced to occupy a preselected quantum energy condition. For rubidium 87 utilized as the resonant media 38 and 24, if the circular polarizer 42 imparts a right-hand circular polarization to the beam of electromagnetic radiation 34, the atoms comprising the resonant medium 24 will be induced by the circularly polarized wavelengths $\lambda_1$ and $\lambda_2$ to make quantum energy transitions into the $m_f=+2$ magnetic substate of the $F=2$ level of the $S_{1/2}$ ground state. In such a condition, the magnetic moment associated with each of the atoms will be aligned in a direction parallel to the weak unidirectional magnetic field 26. Therefore, the resonant medium may be considered as exhibiting a net magnetic moment parallel to this direction.

Similarly, for rubidium 87, if the circular polarizer means 42 imparts a left-hand polarization to the beam of electromagnetic radiation 34, the atoms comprising the resonant medium 24 in the filter gas cell 20 will be induced to occupy positions in the $m_f=-2$ magnetic substate of the $F=2$ level of the $S_{1/2}$ ground state. In this quantum energy condition the magnetic moments of the atoms comprising the resonant medium 24 are aligned parallel to the weak unidirectional magnetic field 26 but may be considered as having an opposite polarity to that when right-hand circular polarization is utilized.

It has been found that aligning the net magnetic moment of the resonant medium 24, by the process described above, affects substantially all the particles comprising the resonant medium 24 and, thus, substantially all the particles are aligned into this preselected quantum energy condition. When the particles comprising the resonant medium 24 are so aligned, this alignment is referred to the particular direction which is parallel to the direction of the weak unidirectional magnetic field 26. On the other hand, when viewed from other directions, these particles do not appear to be in the particular preselected quantum energy condition.

For resonant media other than rubidium 87, the designation of the particular quantum energy condition, in which substantially all the particles are aligned so that their magnetic moments are parallel to a unidirectional magnetic field, will vary. Table I below lists several resonant media together with the appropriate designation of the particular preselected quantum energy condition for this alignment.

*Table I*

| Resonant medium | Quantum energy designation for alignment into preferred condition | | |
|---|---|---|---|
| | Magnetic substate | Level | Ground state |
| Rubidium 87 | $m_f=+2; m_f=-2$ | $F=2$ | $S_{1/2}$ |
| Rubidium 85 | $m_f=+3; m_f=-3$ | $F=3$ | $S_{1/2}$ |
| Sodium 23 | $m_f=+2; m_f=-2$ | $F=2$ | $S_{1/2}$ |
| Potassium 39 | $m_f=+2; m_f=-2$ | $F=2$ | $S_{1/2}$ |
| Cesium 133 | $m_f=+4; m_f=-4$ | $F=4$ | $S_{1/2}$ |
| Lithium 7 | $m_f=+2; m_f=-2$ | $F=2$ | $S_{1/2}$ |
| Thallium 205 | $m_f=+1; m_f=-1$ | $F=1$ | $P_{1/2}$ |
| Mercury 199 | $m_f=+\frac{1}{2}; m_f=-\frac{1}{2}$ | $F=\frac{1}{2}$ | $S_0$ |

As shown on FIGURE 2, an optical pumping lamp means 48 is provided to generate an optical pumping light beam 50. This lamp may be similar to the filter lamp means 32 and operates in substantially the same manner. Thus, in the preferred embodiment, a resonant medium 52 contained in a tube means 36' of the pumping lamp means 48 is the same as resonant media 24 and 38 and, for example, may be rubidium 87. The resonant medium 52 is energized by a second energizing coil means 40a to induce the emission of the optical pumping light beam 50, from the resonant medium 52. This optical pumping light beam 50 contains electromagnetic radiation in the wavelengths corresponding to the emission spectra of the resonant medium 52. The pumping lamp means 48 also includes a second reflector 46a which directs the optical pumping light beam 50 across the resonant medium 24 in a second direction substantially perpendicular to the direction of the weak unidirectional magnetic field 26. The optical pumping light beam 50 contains electromagnetic radiation in both pumping wavelengths and depumping wavelengths.

When rubidium 87 is utilized throughout as the resonant media, the pumping wavelength may be considered as $\lambda_1$ of FIGURE 1 and the de-pumping wavelength as $\lambda_2$ of FIGURE 1. With rubidium 87, the aligned atoms of the resonant medium 24 appear to be substantially all in the $F=2$ quantum energy level but not in the $m_f=+2$ or $m_f=-2$ magnetic substate, when viewed along the second direction. Consequently, energy is absorbed from the optical pumping light beam 50 as it traverses the resonant medium 24 and this energy, that is absorbed, corresponds to that associated with the de-pumping wavelength $\lambda_2$, since this wavelength induces transitions from the magnetic substates of the $F=2$ level of the $S_{1/2}$ ground state to the $P_{1/2}$ first optically excited state. Therefore, the energy contained in this de-pumping wavelength is substantially absorbed. Since few atoms in the resonant medium 24 appear to be in other quantum energy levels as, for example, the $F=1$ level, wavelength $\lambda_1$ is substantially transmitted. Therefore, after traversal of the resonant medium 24, the optical pumping light beam 50a contains substantially no energy in the de-pumping wavelength $\lambda_2$ and a comparatively large amount of energy in the pumping wavelength $\lambda_1$, and the optical pumping light beam 50a may be considered highly monochromatic in the pumping wavelength $\lambda_1$.

This highly monochromatic optical pumping light beam 50a may then be utilized to pump a resonant medium 56 contained in a main gas cell means 20a which may be part of a gas cell frequency standard system (not shown). (A second weak unidirectional magnetic field 26a is provided in regions containing the resonant medium 56 by a second unidirectional magnetic field generator, illustrated by second coil means 28a, to induce Zeeman splitting of the particles comprising the resonant medium 56.) In the preferred embodiment of this invention, the resonant medium 56 is the same resonant medium as that utilized in the filter gas cell 20, the filter lamp 32, and the optical pumping lamp 48. If, for example, rubidium 87 is the resonant medium utilized throughout, the highly monochromatic optical pumping light beam 50a will selectively pump the resonant medium 56 and induce the atoms comprising the resonant medium 56 to make transitions out of the $F=1$ level and into the $F=2$ level, thereby providing the strongly overpopulated condition required for operation of, for example, a gas cell frequency standard system.

Figure 3:
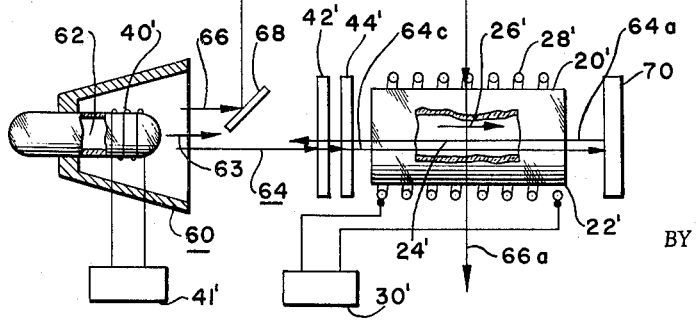
FIGURE 3 illustrates the structure associated with another embodiment of this invention.

FIGURE 3 shows another embodiment of this invention. In this embodiment, one lamp is uniquely utilized to provide both the electromagnetic radiation wavelengths necessary to align the magnetic moments of a resonant medium and the optical pumping light beam. As shown on FIGURE 3, a filter gas cell 20' contains a resonant medium 24' and has walls 22' that are transparent to at least preselected wavelengths of electromagnetic radiation. A unidirectional magnetic field 26' is generated by a unidirectional magnetic field generator, illustrated by coil means 28', which is powered by power supply 30'. A lamp means 60 contains a resonant medium 62 which, in the preferred embodiment of this invention, is the same material as the resonant medium 24' contained in the gas cell 20'.

When the resonant medium 62 is energized by energizing coil means 40', which is powered by source 41', it emits electromagnetic radiation 63 corresponding to the emission specta of the resonant medium 62. A first part 64 of this emitted electromagnetic radiation 63 is utilized as the radiation containing wavelengths necessary to align the magnetic moments of the resonant medium 24' and a second part 66 is utilized to provide the optical pumping light beam.

The first part 64 of the electromagnetic radiation 63 is directed through a circular polarizer means 42' and a filter means 44'. As discussed previously, when the first part 64 leaves the filter means 44', it is comprised substantially of circularly polarized wavelengths of electromagnetic radiation necessary to align the magnetic moments of the resonant medium 24'. This is directed to traverse the resonant medium 24' in a direction substantially parallel to the unidirectional magnetic field 26' and thus aligns the magnetic moments of the particles comprising the resonant medium 24' into a direction substantially parallel to the unidirectional magnetic field 26'.

The first part 64 of the radiation 63 impinges upon a mirror means 70 after traversing the resonant medium 24'. The mirror means 70 is positioned to have a plane of flatness substantially perpendicular to the direction of the unidirectional magnetic field 26' and is substantially reflective of energy contained in the wavelengths necessary to align the magnetic moments of the resonant medium 24'. As a result, a reflected beam 64a containing energy in these wavelengths traverses the resonant medium 24' in a direction parallel but opposite to the direction of unidirectional magnetic field 26'. The polarization of the beam 64a is a mirror image of the polarization of the beam 64. Therefore, the beam 64a enhances the alignment of the particles comprising the resonant medium 24' into the preferred quantum energy condition. Utilization of the mirror means 70 may be incorporated into any embodiment of this invention as, for example, the embodiment shown on FIGURE 2.

The second part 66 of the beam 63 is directed towards a third reflector means 68 which directs the beams towards a fourth reflector means 68a and ultimately to a fifth reflector means 68b. The third reflector means 68, fourth reflector means 68a, and fifth reflector means 68b are positioned so that the second part 66 of the beam 63 may ultimately traverse the resonant medium 24' in a direction substantially perpendicular to the direction of the unidirectional magnetic field 26'.

As this beam so traverses the aligned resonant medium 24', the de-pumping wavelengths contained within the second part 66 of the beam 63 are substantially absorbed and the pumping wavelengths are substantially transmitted, thereby providing a highly monochromatic optical pumping light beam 66a. This monochromatic optical pumping light beam 66a may then be utilized to effect selective quantum energy transitions in optically pumped devices.

Those skilled in the art will find many variations and adaptations of this invention. Therefore, it is intended that the above descriptions of the embodiments of this invention and the accompanying drawings be taken as illustrative and limited only by the appended claims. Having thus described a new and improved electromagnetic radiation arrangement, what is claimed as new and is desired to be secured by Letters Patent of the United States is:

1. In combination: a filter gas cell having walls transparent to preselected wavelengths of electromagnetic radiation energy; a resonant medium comprising rubidium 87 atoms in the gaseous state contained within said filter gas cell at a pressure of approximately $10^{-6}$ millimeters of mercury absolute; unidirectional magnetic field generating means for generating a weak unidirectional magnetic field in a first direction in regions containing said resonant medium to induce Zeeman splitting of said atoms; filter pumping lamp means including atoms of rubidium 87 for emitting a beam of electromagnetic radiation containing energy in wavelengths corresponding to the emission spectra of said rubidium 87 and including wavelengths necessary to align the magnetic moments of said resonant medium; left circular polarizer means intermediate said filter pumping lamp means and said resonant medium for left circularly polarizing said beam of electromagnetic radiation; a $D_1$ filter means intermediate said left circular polarizer means and said resonant medium for transmitting substantially only said necessary wavelengths of said beam of electromagnetic radiation; a first reflector means coupled to said filter pumping lamp means for directing said beam of electromagnetic radiation across said filter gas cell in a direction parallel to said first direction to align substantially all of said atoms of said resonant medium in the $m_f=-2$ magnetic substate of the $F=2$ level of the $S_{1/2}$ ground state; optical pumping lamp means including atoms of rubidium 87 for generating an optical pumping light beam containing energy in wavelengths corresponding to the emission spectra of said rubidium 87 including pumping and de-pumping wavelengths; and a second reflector means coupled to said optical pumping lamp means for directing said optical pumping light beam across said filter gas cell in a direction substantially perpendicular to said first direction whereby said de-pumping wavelengths are substantially absorbed by said resonant medium and said pumping wavelengths are substantially transmitted therethrough.

2. In combination: a filter gas cell having walls transparent to at least preselected wavelengths of electromagnetic radiation; a resonant medium contained within said filter gas cell; means for establishing a weak unidirectional magnetic field in regions containing said resonant medium in a first direction; a filter pumping lamp means for generating a beam of electromagnetic radiation containing energy in wavelengths corresponding to the emission spectra of said resonant medium; polarizer means intermediate said filter lamp means and said filter gas cell for circularly polarizing said beam of electromagnetic radiation; filter means intermediate said polarizer means and said filter gas cell for filtering said beam of electromagnetic radiation to transmit substantially only energy in wavelengths necessary to align the magnetic moments of said resonant medium; means coupled to said filter lamp means for directing said necessary wavelengths across said filter gas cell to traverse said resonant medium in said first direction and thereby align a net magnetic moment of said resonant medium in a direction parallel to said first direction; mirror means coupled to said filter gas cell for intercepting said necessary wavelengths after traversing said resonant medium and directing a reflected beam of necessary wavelengths across said resonant medium in a direction parallel to the first direction; means for generating an optical pumping light beam containing energy in pumping and de-pumping wavelengths; and means for directing said optical pumping light beam across said filter gas cell to traverse said resonant medium in a second direction substantially perpendicular to said first direction whereby at least one of said de-pumping wavelengths is substantially absorbed by said resonant medium and at least one of said pumping wavelengths is substantially transmitted therethrough.

References Cited by the Examiner

UNITED STATES PATENTS

| | | | |
|---|---|---|---|
| 2,884,524 | 4/59 | Dicke | 88—61 |
| 2,929,922 | 3/60 | Schawlow et al. | 88—61 |
| 3,098,112 | 7/63 | Horton | 88—61 |
| 3,150,313 | 9/64 | Dehmelt. | |

FOREIGN PATENTS

| | | |
|---|---|---|
| 1,228,868 | 3/60 | France. |

OTHER REFERENCES

Bell et al. "Optical Detection of Magnetic Resonance in Alkali Metal Vapor, Physical Review, vol. 107. No. 6, Sept. 15, 1957, pp. 1559–1564.

Franzen et al. "Atomic Orientation of Optical Pumping," Physical Review, vol. 108, No. 6, Dec. 15, 1957, pp. 1453–1458.

Skillman "Measurements of the Earth's Magnetic Field With A Rubidium Vapor Magnetometer," Journal of Geophysical Research, vol. 63, No. 3, September 1958, pp. 513–515.

JEWELL H. PEDERSEN, *Primary Examiner.*

EMIL G. ANDERSON, *Examiner.*